F. C. TAXIS.
CONCRETE FLOOR CONSTRUCTION.
APPLICATION FILED DEC. 29, 1910.
Reissued May 30, 1911.
13,252.
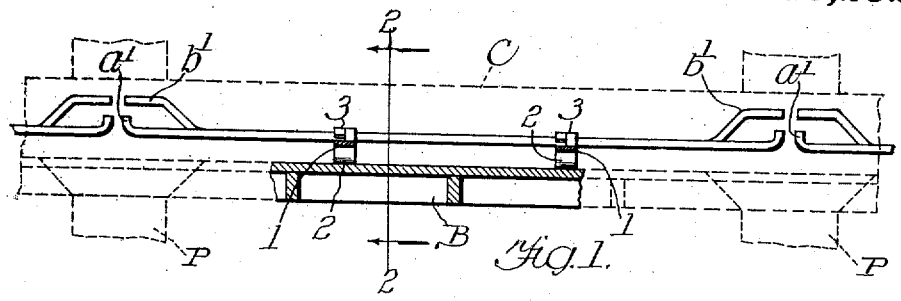
Fig. 1.
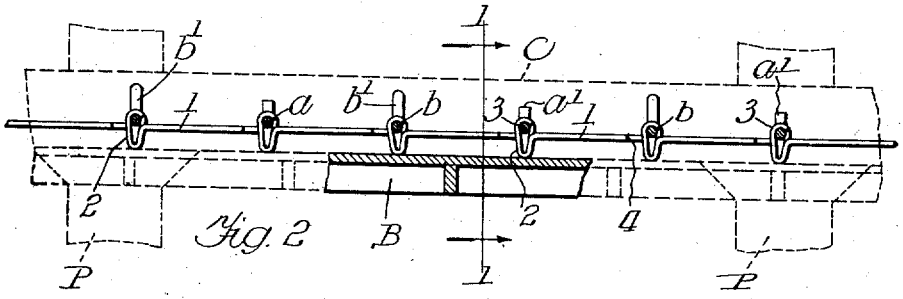
Fig. 2
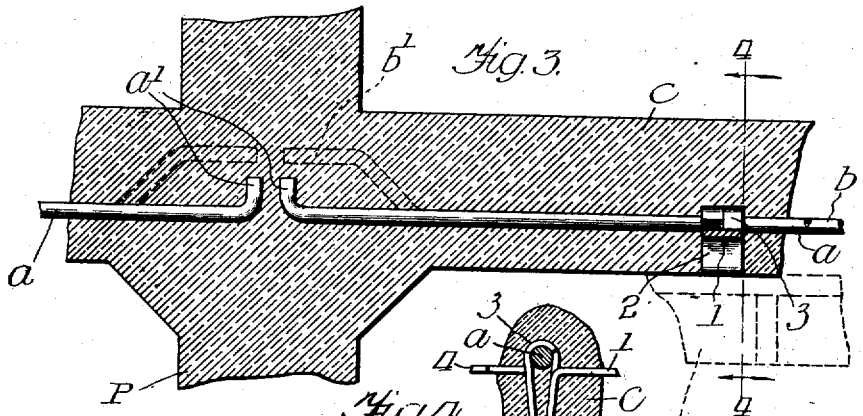
Fig. 3.
Fig. 4.
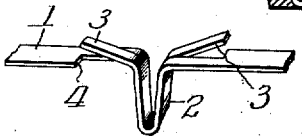
Fig. 5.
Witnesses:
Robert N. Weir
George L. Chindahl
Inventor:
Frederick C. Taxis,
By Luther E. Miller
Atty
THE NORRIS PETERS CO., WASHINGTON, D. C.

UNITED STATES PATENT OFFICE.

FREDERICK C. TAXIS, OF ST. LOUIS, MISSOURI, ASSIGNOR OF ONE-HALF TO WILLIAM B. HOUGH COMPANY, OF CHICAGO, ILLINOIS, A CORPORATION OF ILLINOIS.

CONCRETE FLOOR CONSTRUCTION.

13,252. Specification of Reissued Letters Patent. Reissued May 30, 1911.

Original application filed July 27, 1907, Serial No. 385,842. Divided and application filed April 27, 1908, Serial No. 429,400. Original No. 910,971, dated January 26, 1909. Application for reissue filed December 29, 1910. Serial No. 599,961.

*To all whom it may concern:*

Be it known that I, FREDERICK C. TAXIS, a citizen of the United States, residing at St. Louis, State of Missouri, have invented certain new and useful Improvements in Concrete Floor Construction, of which the following is a full, clear, and exact description, reference being had to the accompanying drawings, forming a part hereof.

My invention has relation to improvements in concrete-floor constructions; and it consists in the novel details more fully set forth in the specification and pointed out in the claims.

In the drawings, Figure 1 is a vertical section of a concrete floor showing my invention applied thereto, the section being on the line 1—1 of Fig. 2, and the concrete being shown dotted; Fig. 2 is a section at right angles to Fig. 1, being a section on line 2—2 of Fig. 1; Fig. 3 is an enlarged section on the order of Fig. 1, showing the concrete in full; Fig. 4 is a vertical section on line 4—4 of Fig. 3; and Fig. 5 is a perspective of one of the transverse tie members.

The present application is a division of my application for patent upon concrete-floor constructions, filed July 27, 1907, Serial Number 385,842, and like it has for its object to introduce into a concrete floor construction a structural detail which shall not only serve to properly space and tie the metallic reinforcing and supporting bars for the concrete, but shall at the same time serve as a gage for the construction of the boxing into which the cement composition is poured around the bars previously spaced and positioned. With my improvement any shifting of the reinforcing members is impossible, a thorough tying is insured and a uniform construction is obtained.

In detail the invention may be described as follows: Referring to the drawings, P, P, represent concrete (or other) pillars for the support of the concrete floor, the latter being made up of suitable cement composition C, and a series of supporting and reinforcing bars or members *a b* respectively, having upturned ends *a′ b′* respectively, the said members forming the supports for the floor, the ends thereof resting directly on the pillars P where the latter are resorted to, or on I-beams or equivalent structural members (not here illustrated as they are fully understood in the art). The body or main portion of the members *a b* are disposed in the same horizontal plane at equal distances from the opposite faces of the completed floor as shown, the cement being as well understood, temporarily laid on and supported by the false floor or boxing B, which is removed when the concrete has fully set and hardened.

In the construction of the floor the supporting and reinforcing members are (as well understood) laid with their opposite ends over the pillars (or structural members) and disposed parallel to one another at predetermined distances apart. To insure permanent parallelism therefor and prevent displacement thereof, I tie the several members *a b* together by means of a series of cross spacing members or tie-bars which in the present form of my invention are in the shape of metal strips 1 provided with depending U-shaped bends 2 on either side of which, and on opposite sides of the strips, are disposed the arms or anchors 3, 3, cut from the body of the strip, the depth of the cut being indicated by the offsets 4, and the length of the cut extending from said offsets to the points where the bends merge with the body of the strip. The anchors 3, and bends 2 which constitute the spacing legs or gages between the boxing and tie members are thus formed integrally with said tie members. From the manner of their formation in the present embodiment, the anchors 3 obviously and necessarily are disposed on opposite sides of the longitudinal center of the strip 1.

By "concrete" floor constructions, I of course wish to include any and all floors or walls of a composite character, that is, those composed of composition, concrete, or cement reinforced by metal, the term "concrete" being herein used in its broadest sense. It is obvious of course that the tie members 1 need not necessarily be at right angles to the reinforcing members *a b*. The tie-bars 1 are connected to the members *a b* by folding the arms or anchors 3, 3, about the members as shown in the drawing. The members *a b* are thus superposed directly over the the members 1, the spacing legs or gages 2 serving to space the roof of the boxing B a fixed distance from the reinforcing members, the legs thus performing the function of gages which determine the depth of the concrete below the planes of the reinforcing members, the bases of the legs coming in contact with the boxing as the latter is undergoing construction, and coming flush with the under surface of the concrete portion of the floor when the latter is finished.

As shown in the drawings, the pairs of opposed arms 3 are disposed at intervals along the strips 1, one end of each arm being free, and the arms of each pair being adapted to embrace a reinforcing member.

I claim as my invention:

1. A combination tie and gage member for a concrete floor construction, comprising a sheet-metal strip having a series of bends formed in the body thereof and disposed at intervals along the same, said bends constituting legs or gages, and arms on either side of said bends, cut from the body of the strip and adapted to embrace a reinforcing member.

2. A combination tie and gage member for a concrete floor construction, comprising a strip having a series of bends formed on the body thereof, and disposed at intervals along the same, constituting V-shaped legs, and arms on either side of the V-shaped spaces, cut from the body of the original strip on opposite sides of said strip, substantially as set forth.

3. In combination with a reinforcing member of a concrete floor, a combination tie and gage member disposed below the same and transverse thereto, comprising a strip having a series of bends formed in the body thereof and disposed at intervals along the same constituting V-shaped legs, and arms on either side of the V-shaped spaces, cut from the body of the original strip on opposite sides of said strip, and folded over the reinforcing member, substantially as set forth.

4. In combination with a reinforcing member of a concrete floor, a tie member or strip having a series of suitably spaced U-shaped bends formed integrally therewith and depending therefrom across the entire width thereof, an anchor arm cut or formed from the tie-member along each edge thereof at points contiguous to the merger of the bends with the body of the tie-member, said anchors being of suitable length to permit the same to be folded about the reinforcing member, substantially as set forth.

In testimony whereof I affix my signature in presence of two witnesses.

FREDERICK C. TAXIS.

Witnesses:
Wm. B. Hough,
George L. Chindahl.

Copies of this patent may be obtained for five cents each, by addressing the "Commissioner of Patents, Washington, D. C."